United States Patent
Robinson et al.

(10) Patent No.: US 6,917,681 B2
(45) Date of Patent: *Jul. 12, 2005

(54) PEAK POWER MANAGEMENT AND ACTIVE DECOUPLING ARRANGEMENT FOR SPAN-POWERED REMOTE TERMINAL ACCESS PLATFORMS

(75) Inventors: Steven M. Robinson, Madison, AL (US); Ralph R. Boudreaux, Jr., Madison, AL (US); John S. McGary, Petersburg, TN (US); John B. Wilkes, Jr., Harvest, AL (US)

(73) Assignee: Adtran, Inc., Hunstville, AL (US)

( * ) Notice: Subject to any disclaimer, the term of this patent is extended or adjusted under 35 U.S.C. 154(b) by 306 days.

This patent is subject to a terminal disclaimer.

(21) Appl. No.: 10/114,531

(22) Filed: Apr. 1, 2002

(65) Prior Publication Data

US 2003/0185385 A1 Oct. 2, 2003

(51) Int. Cl.[7] ............................................. H04M 3/02
(52) U.S. Cl. ........................... 379/387.01; 379/413.01; 379/413; 379/251; 379/252
(58) Field of Search ..................... 371/473, 473.07, 371/478, 399.01, 372, 373.07, 257, 252; 363/78–80

(56) References Cited

U.S. PATENT DOCUMENTS 5,289,359 A * 2/1994 Ziermann ................. 363/21.11
5,539,805 A * 7/1996 Bushue et al. ............. 379/361
6,584,197 B1 * 6/2003 Boudreaux et al. .... 379/413.02
6,690,792 B1 * 2/2004 Robinson et al. .......... 379/418

OTHER PUBLICATIONS

U.S. Appl. No. 09/442,299, entitled: Active Decoupling and Power Management Circuit for Line–Powered Ringing Generator.

U.S. Appl. No. 09/378,382, entitled Power– Limited Remote Termination Converter with Wetting Current and Emergency Power Ooperation for Digital Data Services Equipment.

* cited by examiner

Primary Examiner—Sinh Tran
Assistant Examiner—Walter F Briney, III
(74) Attorney, Agent, or Firm—Allen, Dyer, Doppelt, Milbrath & Gilchrist, P.A.

(57) ABSTRACT

A power management circuit for a remote access platform extracts power from a wireline for powering a ring generator that generates a ringing voltage signal that is distributed to a plurality of subscriber circuits. A power-limited voltage converter steps up the wireline voltage to a higher 'isolating' voltage, charging a capacitor coupled to the ring generator. A monitor circuit reduces the power that the power-limited voltage converter can draw, if the wireline voltage drops too low. This prevents the wireline voltage from collapsing should the remote terminal be deployed at a distance from wireline voltage source (the central office) greater than its specified capability.

12 Claims, 1 Drawing Sheet

PEAK POWER MANAGEMENT AND ACTIVE DECOUPLING ARRANGEMENT FOR SPAN-POWERED REMOTE TERMINAL ACCESS PLATFORMS

FIELD OF THE INVENTION

The present invention relates in general to a power management circuit for a span-powered remote access platform generating a ringing voltage distributed to a plurality of subscriber circuits. A power-limited voltage converter steps up the span-derived voltage to a higher 'isolating' voltage to charge an energy reservoir capacitor coupled across voltage inputs to a ring generator. A monitor circuit reduces the power that the power-limited voltage converter can draw, if the (span) voltage drops too low. This prevents the input voltage from collapsing should the remote terminal be deployed at a distance from the central office greater than its specified capability.

BACKGROUND OF THE INVENTION

Digital subscriber line (DSL) technologies, such as HDSL and HDSL2, are currently used by telecommunication service providers to deliver services such as ADSL, SHDSL, ISDN and POTS to terminal access platforms at remote (customer premises) installations. In addition to sending voice and/or data over the telephone lines, the service provider may use the same wireline pair to transport main or auxiliary power to the remote terminal equipment from the telephone company's central office (CO). This method of remote wireline powering, commonly referred to as 'loop' or 'span' powering, offers significant flexibility in deployment and reliability of service, as it permits the phone companies to power terminal equipment located up to several miles away from the central office.

POTS service requires the availability of a (relatively large) ringing voltage at the remote access platform which, in the case of a line powered device, must be supplied over the same wireline pair. Unfortunately, the power delivered by the ring generator (and thus delivered to it) can be expected to fluctuate substantially over time, because of the time-varying nature of the ringing waveform and the statistically changing load requirements. The peak input power required by a remote access platform can exceed the power available to it, due to the peak load demand on the ring generator; still, the ring generator must be capable of meeting reasonable load demands for the system to be viable.

The amount of power available to the remote access platform and the ringing load is limited in accordance with the expression:

$$P_{RT}=(V_{CO})^2/4R_L$$

where PRT is the power delivered to the remote access platform (RT), $V_{CO}$ is the central office span voltage, and RL is the line resistance. $V_{CO}$ is limited by telecom industry standards, safety requirements, and voltage breakdown limitations of some twisted pair telephone cable. Therefore, arbitrary increases in span voltage to meet powering requirements of the remote equipment are not feasible.

A second problem is that noise associated with the generation of the ringing voltage can mix with the DSL signal, and cause significant performance problems for the DSL signal. Some DSL systems are very sensitive to ringing voltage ripple because the 20 Hz ring frequency is high enough to interfere with the signal, yet too low for the analog or digital filters of the signal path to attenuate. Passive power filtering between the remote terminal's input and the ringing generator requires a physically large circuit and may not be practical, because of the low frequency and the amount of attenuation required. For a 50 Vrms ringing voltage, 80–100 dB of attenuation may be required at 20 Hz.

Advantageously, these problems are successfully addressed for single subscriber line applications by the invention disclosed in co-pending U.S. patent application Ser. No. 09/442,299 (hereinafter referred to as the '299 application), now U.S. Pat. No. 6,690,792 B1, entitled: "Active Decoupling and Power Management Circuit for Line-Powered Ringing Generator," by S. Robinson et al, assigned to the assignee of the present application, and the disclosure of which is incorporated herein. In particular, the '299 application discloses a ringing voltage power management circuit that generates an isolated high-value voltage derived from the powered wireline through a linear current-limiting circuit, and uses this isolated high-valued voltage to charge a storage capacitor, that serves as an energy reservoir for the ringing voltage generator for the subscriber line. The storage capacitor and the current-limiting circuit isolate the peak power drawn by the ringing load from the telephone line's remote terminal input and translate the 20 Hz ripple to the sub-Hz oscillations of the ringing cadence (ring on/off cycle).

While the linear nature of this current limiting circuit results in a power dissipation that is acceptable for single subscriber line applications, it is not feasible for use with a remote access platform serving considerably more than one line (e.g., twenty-four lines in one present day remote terminal device) and having a potentially much higher ringing power, where a linear (dissipative) circuit to limit peak power is not acceptable.

This power demand problem also occurs in hybrid schemes that are capable of extracting both local power and span power for operating the remote terminal equipment. For example, co-pending U.S. patent application Ser. No. 09/378,382, (hereinafter referred to as the '382 application), now U.S. Pat. No. 6,584,197 B1, entitled: "Power-Limited Remote Termination Converter with Wetting Current and Emergency Power Operation for Digital Data Services Equipment," by R. Boudreaux Jr., assigned to the assignee of the present application, and the disclosure of which is incorporated herein, describes a dual power management system that monitors the power availability for and power requirements of the remote termination equipment.

For normal operation, local power is used to meet all terminal needs, except for a small amount of power drawn from the span for wetting current purposes. During emergency operation (loss of local power) the functionality of the remote unit is reduced to conserve power, so that only lifeline POTS is available. In this mode, power is derived from the phone line up to a maximum value that prevents the line from collapsing, and satisfies current industry proposals. In addition, an auxiliary capacitor stores a limited quantity of energy from the local utility interface or the span, to enable extended power operation (including ringing the phone).

Now although the power management scheme described in the '382 is a relatively cost-effective architecture, due to the low power and simultaneous dual power input nature of the remote terminal, it is not particularly suited for higher power and single input (wireline only) applications.

SUMMARY OF THE INVENTION

The present invention is directed to a new and improved power management scheme for a span-powered remote access platform serving (supplying ringing voltage to) a plurality of subscriber circuits. The invention employs a power-limited voltage converter that steps up the span-derived voltage to a substantially higher 'isolating' voltage to charge an energy reservoir capacitor coupled across voltage inputs to a ring generator. The isolating voltage need not be higher than the span voltage. However, since energy storage is a product of capacitance and the square of the voltage, whereas capacitor size and price are approximately proportional to the product of capacitance and voltage, a higher isolating voltage will generally realize a smaller and more cost-effective circuit.

The output voltage produced by the ring generator is distributed to a plurality of POTS line circuits for application to individual phones as required. Thus, the load on the ring generator will depend upon the number of phone lines in use (ringing) and the ringer equivalency number (REN) load of each of the lines to which the ringing voltage is applied. When the load on the ring generator is relatively small—its input power is less than the maximum output power of the voltage converter—the voltage converter charges the reservoir capacitor to a maximum value of isolating voltage.

In a complementary manner, when the load on the ring generator exceeds the output power of the voltage converter, the isolating voltage begins to decrease, releasing energy from the reservoir capacitor into the ring generator. The isolating voltage and the reservoir capacitor are chosen to provide enough energy to enable the ring generator to sustain a predetermined load for a minimum amount of time. If the isolating voltage becomes too small, an isolation voltage monitoring circuit outputs a signal to the remote terminal's controller to cause the ring cadence to be reduced, which effectively reduces the load on ring generator.

To protect the system from over deployment—a situation where the remote terminal is deployed at a distance from the central office greater than its specified capability—a monitor circuit reduces the power the voltage converter can supply, to prevent the input voltage from collapsing under a specified ring load.

In accordance with a non-limiting, but preferred embodiment, the power-limited voltage converter has a flyback topology-based configuration, operating in discontinuous inductor current mode. To this end, a pulse-width modulating (PWM) power supply controller is used to generate a programmable frequency rectangular waveform, and having a maximum duty cycle of fifty percent. This PWM waveform is used as a switch control input to a switching MOSFET, having its source-drain path coupled in series with an input voltage from the span and the primary winding of a transformer whose secondary winding is rectifier-coupled to the isolating voltage-storing, reservoir capacitor for the ring generator.

The isolating voltage is divided down and fed back to the voltage feedback terminal of the PWM controller for comparison with the internal reference voltage of the PWM controller. During each switching cycle of the switching MOSFET, energy is stored in the transformer's primary winding is fully released to the storage capacitor and ringing generator, before a new cycle begins.

If the fed back voltage begins to exceed the PWM controller's internal reference value, the PWM control chip reduces the duty cycle of its output waveform, so as to charge the transformer's primary winding to a lower peak current, thus reducing the energy stored in the primary winding during each switching cycle. On the other hand, if the feedback voltage decreases, the primary winding is charged to a higher peak current. This complementary action regulates the maximum isolating voltage.

A capacitor coupled between the voltage feedback port and the comparison port of the PWM controller limits the rate at which the output voltage of a feedback amplifier internal to the PWM controller can change, thus limiting the bandwidth of the voltage converter control loop. This is significant, since limiting the bandwidth to a frequency lower than the ringing voltage (typically on the order of 20 Hz) reduces the ripple current (and thus ripple voltage) induced by the operation of the ring generator on the DSL input lines. For DSL service over a two-wire link (such as HDSL2) this feature is very important, since the span voltage and its noise components are in series with the DSL signaling path. Any ripple induced by the 20 Hz ring generator output is difficult to filter passively because of its low frequency. Thus, the ability to limit the bandwidth of the voltage-converter allows it to operate as an active filter.

When the output switching MOSFET Q1 is conducting, a resistor coupled between its source and ground creates a voltage that is an analog of the primary winding current. This 'current-sense' voltage is coupled through a resistor to the ISENSE port of the PWM controller. A low pass resistor-capacitor filter is used to reduce high frequency noise on the current signal, without fundamentally changing its waveform. If the current sense voltage reaches a prescribed value set internally in the PWM controller, the PWM output waveform pulse is terminated, which limits the energy stored in the transformer and available to the ring generator's reservoir capacitor. This means that the maximum peak primary winding current can be appropriately programmed to set the maximum output power.

If the ring generator requires more power than the maximum programmed value, the isolating voltage will decrease in response. The maximum power value is chosen so that, at a maximum specified deployment length, and with the remote access terminal being fully utilized (operating at maximum power), there is as much power available to the ring generator as possible, without the ring generator load being able to collapse the span voltage.

The energy reservoir capacitor is chosen to store sufficient energy to meet reasonable ring load requirements for the number of POTS lines. The isolating voltage across this capacitor drops when the ring load demand exceeds the maximum output of the power limited converter. The capacitor releases energy to the ring generator as this voltage decreases. This also occurs during the peaks of the ringing waveform, as the converter outputs only the average load power (i.e. active low pass filtering) . As noted above, since the size of the capacitor is related to the product of capacitance and voltage, whereas energy increases with the square of the voltage, increasing the isolating voltage will allow for use of a physically smaller and less expensive capacitor.

Since its maximum power is selected in accordance with the rated deployment length, the power-limited voltage converter can draw more power than the span can support if the system is over-deployed (at a distance exceeding its ratings), which could cause the span voltage to collapse. To address this issue, the over-deployment monitor circuit uses a differential amplifier, which compares the differential span (input ) voltage, in terms of the Tip voltage relative to the Ring voltage with the reference voltage of the PWM controller. If the input voltage is too low, the monitor circuit reduces the power the power-limited voltage converter can draw.

The amplifier's output controls a buffering device, such as a bipolar transistor, having its controlled current flow (collector-emitter) path coupled between ground and the COMP port of the PWM controller. When the input voltage is sufficiently high, the output of the amplifier is forced to it's highest value, which reverse-biases the transistor and the power-limited converter operates as described above. When the input voltage drops to a low value (indicating too much power is being drawn by the system), the amplifier's output voltage is reduced, so that the buffering device controlled thereby conducts, to pull the input port of the PWM controller to a lower voltage. This reduces the maximum current sense voltage which, in turn, reduces the maximum peak current through the primary winding of the transformer and decreases the maximum power the converter can extract from the line.

DETAILED DESCRIPTION

Figure 1:
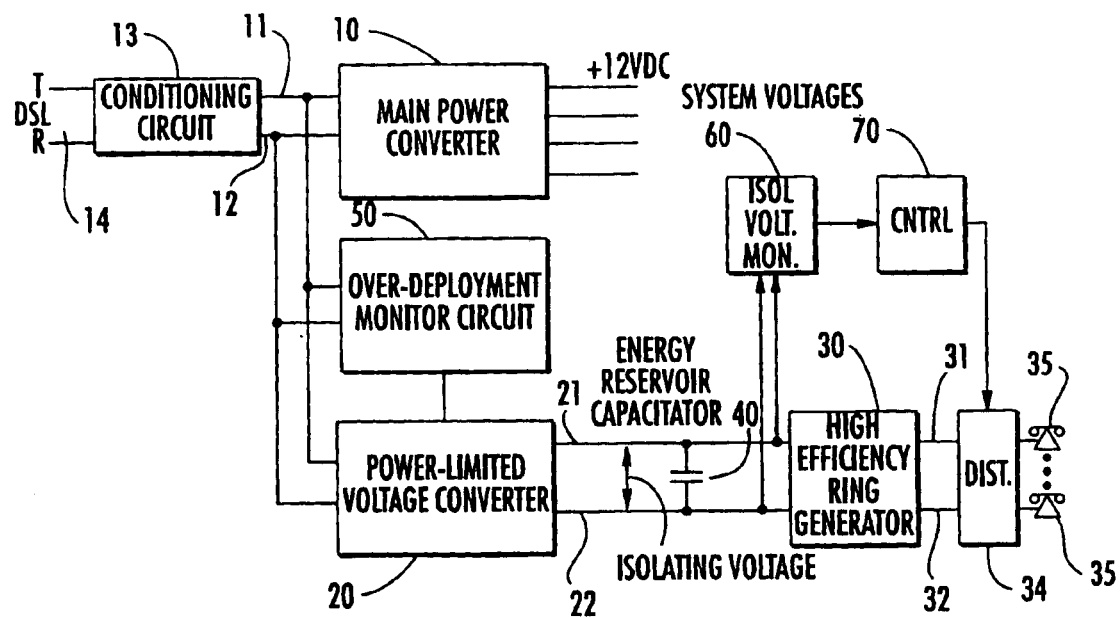
FIG. 1 is a block diagram of a preferred embodiment of the invention.

Before detailing the peak power management and active decoupling arrangement of the present invention, it should be observed that the invention resides primarily in a prescribed arrangement of conventional wireline telecommunication and power converter hardware circuits and components therefor. Consequently, the configuration of such circuits and components and the manner in which they may be interfaced with a telecommunication wireline pair have, for the most part, been illustrated in the drawings by readily understandable block diagrams and attendant schematics, which show only those specific details that are pertinent to the present invention, so as not to obscure the disclosure with details which will be readily apparent to those skilled in the art having the benefit of the description herein. Thus, the diagrammatic illustrations of the Figures are primarily intended to show the major elements of the invention in convenient functional groupings, whereby the present invention may be more readily understood.

Attention is initially directed to FIG. 1, which shows a preferred embodiment of the invention in block diagram form, comprising a main power converter 10, wireline inputs 11 and 12 of which are respectively coupled by way of a conventional signal conditioning circuit 13 to a DSL wireline pair 14 transporting operating voltages from a central office facility for the remote terminal, including control and bias voltages, that are coupled to a power-limited converter 20 and a ring generator 30. The power-limited voltage converter 20 (shown in detail in the schematic diagram of FIG. 2, to be described) serves to boost the input voltage Vin to a substantially higher 'isolating' voltage for application over a line pair 21 and 22 to an energy reservoir, shown as a capacitor 40, and to the ring generator 30. The isolating voltage produced by the power-limited voltage converter 20 need not necessarily be higher than the span voltage. However, since energy storage is a product of $CV^2$, whereas capacitor size and price are approximately proportional to CV, a higher isolating voltage generally translates into a smaller and more cost-effective circuit.

The output voltage produced by the ring generator 30 at output terminals 31 and 32 is distributed by way of a controlled switching unit 34 to a plurality of POTS line circuits for application to individual phone lines 35 as required. Thus, the load on the ring generator 30 will depend upon the number of phone lines in use (ringing) and the ringer equivalency number (REN) load of each of the lines to which the ringing voltage is applied. An over-deployment monitor circuit 50 (also shown in detail in FIG. 2, to be described) monitors the input voltage. If the span voltage becomes too low (indicating over-deployment of the span) the monitor circuit 50 reduces the power output capability of the power-limited voltage converter 20, preventing the span voltage from collapsing.

When the ring generator 30 is lightly loaded, in that its input power is less than the maximum output power of power-limited voltage converter 20, the voltage converter charges the reservoir capacitor 40 to the maximum isolating voltage $V_{MAX}$. On the other hand, if the load on the ring generator 30 increases such that its input power is greater than the output power of the power-limited voltage converter 20, the isolating voltage begins to decrease, releasing energy from the reservoir capacitor 40 to the ring generator. The isolating voltage and the reservoir capacitor 40 are chosen to provide enough energy for the ring generator 30 to sustain a predetermined load for a minimum amount of time. The energy stored and available for decoupling is given by the expression:

$$\text{energy} = C[(V_{MAX})^2 - (V_{MIN})^2]/2,$$

where $V_{MIN}$ is the minimum operating input voltage of the ring generator 30.

From this expression, it will be appreciated that there is great flexibility in choosing $V_{MAX}$ and C, and that increasing $V_{MAX}$ reduces the required value of C.

An isolation voltage monitoring circuit 60 monitors the isolating voltage across lines 21 and 22; if the isolating voltage becomes too small, the isolation voltage monitoring circuit 60 outputs a signal to the remote terminal's controller 70 to cause the ring cadence to be reduced, which effectively reduces the load on ring generator 30.

Figure 2:
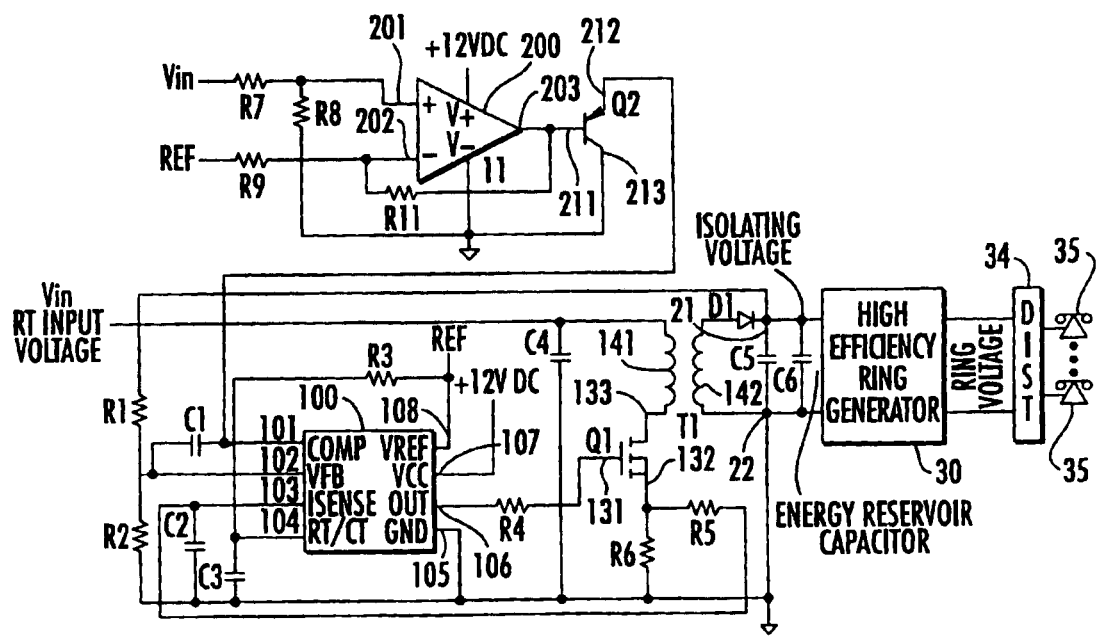
FIG. 2 is a schematic illustration of details of the power-limited converter and over-deployment monitor circuit of the invention shown in FIG. 1.

Referring now to the schematic diagram of FIG. 2, the power-limited voltage converter 20 is shown as having a flyback topology-based power converter configuration, operating in the so-called 'discontinuous inductor current' mode. There are numerous power converting circuits that can perform this same function. The fundamental properties of any circuit used for the power-limiting voltage converter are that it must efficiently boost the input voltage Vin to a significantly higher output (isolating) voltage (so as to minimize size and cost of the energy-reservoir capacitor 40), and it must be able to limit its input power with reasonable accuracy. Further beneficial properties include reducing the maximum input power by external control, and the ability to set bandwidth of the converter control circuit to a relatively low frequency. While the general architecture and operation of a discontinuous flyback circuit are well understood by those skilled in power conversion technology, for completeness, a non-limiting implementation will be described.

As shown in the schematic diagram of FIG. 2, the power-limited voltage converter includes a pulse-width modulating (PWM) power supply controller 100, such as a commercially available UC3845 integrated circuit PWM chip. PWM power supply controller 100 produces a rectangular output waveform at its output (OUT) port 106, with the frequency of the output waveform being programmable in accordance with the selection of a resistor R3 coupled between a time constant control port 104 and a voltage reference REF port 108, and a capacitor C3 coupled between port 104 and ground (GND). The maximum duty cycle of the output waveform produced by the pulse width modulator chip 100 is 50%.

For a DC voltage of +12 VDC (provided by the main power converter 10, shown in FIG. 1) coupled to the VCC port 107 of the PWM chip 100, output port 106 produces a rectangular waveform that is coupled through a resistor R4 to the gate 131 of a switching MOSFET Q1. Switching MOSFET Q1 may comprise an N channel enhancement-mode MOSFET, the source-drain path between terminals 132 and 133 of which is switched on/off in response to the waveform applied to its gate terminal 131. When switching MOSFET Q1 is turned on, or conducting, the input voltage Vin 11 is applied across the primary winding 141 of transformer T1 coupled to the switching MOSFET's drain terminal 133, and an increasing or ramping up current flows through primary winding 141 in response.

When the output waveform from the PWM control chip 100 changes state and causes the switching MOSFET Q1 to turn off (become non-conducting), there is a polarity reversal on the transformer windings and the energy stored in the primary winding 141 of transformer T1 is released to the secondary winding 142. This released energy is coupled through a diode D1 and charges a pair of capacitors C5 and C6 of the energy storage reservoir 40 installed across the output terminals 21 and 22, to produce a prescribed DC output voltage as the isolating voltage. Capacitor C5 is typically smaller than capacitor 16 and is within the power converter, while capacitor C6 is the larger principal bulk energy storage device. The diode D1 prevents the capacitors from being discharged by the transformer T1 when its primary 141 is conducting.

The isolating voltage is fed back from line 21 to a voltage divider comprised of a resistor R1 and a resistor R2, which divide down the isolating voltage and apply it to voltage feedback terminal 102 of the PWM controller 100 for comparison with the internal reference voltage of the PWM controller. During each switching cycle of the switching MOSFET Q1, energy is stored in the primary winding 141 of the transformer T1 and fully released to the output lines 21 and 22 before a new cycle begins. Ignoring losses, the output power Po may be expressed as:

$$Po = Lp(I_{PK})^2 f/2$$

where Po is the voltage converter output power, Lp is the primary inductance of the transformer T1, $I_{PK}$ is the peak current in the primary winding 141 of transformer T1, and f is the frequency that MOSFET Q1 operates.

When the fed back voltage attempts to exceed the PWM controller's internal reference value, the PWM control chip 100 reduces the duty cycle of its rectangular output waveform at the output port 106, thus charging the transformer primary winding 141 to a lower peak current, and therefore reducing the energy stored in the transformer's input winding 141 during each switching cycle. On the other hand, when the feedback voltage decreases, the primary winding 141 is charged to a higher peak current. Thus, the maximum isolating voltage across lines 21 and 22 is regulated.

A capacitor C1 coupled between the voltage feedback port 102 and compensation (COMP) port 101 of the PWM controller 100 limits the rate at which the output voltage of a feedback amplifier internal to the PWM controller 100 can change, thus limiting the bandwidth of the voltage converter control loop. This is significant, since limiting the bandwidth to a frequency lower than the ringing voltage (typically 20 Hz, as described above) reduces the ripple current (and thus ripple voltage) induced by the operation of the ring generator on the DSL input lines. (Where the DSL service is a four-wire link (as in the case of HDSL or HDSL4 service), this feature is less important, since the span voltage and its noise components are common to the DSL signaling.) For DSL service over a two-wire link (such as HDSL2) this feature is very important, since the span voltage and its noise components are normal (in series) with the DSL signaling path. Any ripple induced by the 20 Hz ring generator output is difficult to filter passively because of its low frequency. Thus, the ability to limit the bandwidth of the voltage-converter allows it to operate as an active filter.

When MOSFET Q1 is conducting (turned on) a resistor R6 coupled between source 133 and ground creates a voltage that is an analog of the primary winding current. This voltage (known as current-sense voltage) is coupled through a resistor R5 to the ISENSE port 103 of the PWM controller 100, which is coupled through a capacitor C2 to the ground reference terminal. The resistor R5 and capacitor C3 constitute a low pass RC filter, which is chosen to reduce high frequency noise on the current signal, without fundamentally changing its waveform. If the current sense voltage reaches a prescribed value (e.g., as set internally in the PWM controller 100), the PWM output waveform pulse is terminated, which limits the energy stored in the transformer (and available to the output).

This means that the maximum peak primary winding current can be appropriately programmed (e.g., at 1V/R6) and the maximum output power $P_{o\_MAX}$ can be set in accordance with the expression:

$$P_{o\_MAX} = Lp(I_{PK\_MAX})^2 f/2$$

where $I_{PK\_MAX}$ is the programmed maximum peak current.

If the ring generator 30 demands more power than $P_{o\_MAX}$, the output (isolating) voltage will decrease in response. The value of $P_{o\_MAX}$ is chosen so that at a maximum specified deployment length, and with the remote access system fully utilized (operating at maximum power), there is as much power available to the ring generator as possible, without the ring generator load being able to collapse the span voltage.

The energy reservoir capacitor C6 is chosen to store sufficient energy to meet reasonable ring load requirements for the number of POTS lines served by the invention. The isolating voltage across capacitor C6 drops, when the ring load demand exceeds the maximum output of the power limited converter. Capacitor C6 releases energy to the ring generator as this voltage decreases. This also occurs during the peaks of the ringing waveform, since the converter provides only the average load power (i.e. active low pass filtering).

The amount of energy $W_{CAP}$ stored in the reservoir capacitor C6 is given by the expression:

$$W_{CAP} = C(V_{MAX})^2/2,$$

where $V_{MAX}$ is the maximum isolating voltage and C is the value of capacitor C6. Since energy increases with the square of the maximum voltage, as described above, the value of capacitor C6 can be reduced by making $V_{MAX}$ large. Also, the size of the capacitor is related to the product of capacitance and voltage (CxV), but W increases with the square of the voltage; therefore, a physically smaller and less expensive capacitor can be used by increasing the isolating voltage.

Since its maximum power is selected in accordance with the rated deployment length, the power-limited voltage converter can draw more power than the span can support if the system is over-deployed. That is, if the remote terminal is deployed at a distance exceeding its ratings, it could cause the span voltage to collapse. To make operation robust even when over-deployed, the over deployment monitor circuit 50 uses a differential amplifier 200, which is powered by the +12 VDC provided by the main power converter 10. The input voltage Vin is divided down by resistors R7 and R8 and coupled to the non-inverting terminal of amplifier 200. It is compared to the reference voltage REF, coupled through resistor R9 to the inverting (−) input 202 of amplifier 200. If the input voltage yin is too low, the monitor circuit reduces the power the power-limited voltage converter can draw.

A feedback resistor R11 is coupled between the amplifier output 203 and its inverting input terminal 202, and is used to set the amplifier gain. The amplifier output is coupled to the base 211 of a PNP transistor Q2, which has its emitter 212 coupled to the COMP port 101 of PWM controller 100, and its collector 213 coupled to ground.

When the input voltage Vin 11 is sufficiently high, the voltage of the non-inverting input 201 of amplifier 200 is greater than the voltage of the inverting input 202, which forces the amplifier output 203 to it's highest value. As a result, the PNP transistor Q2 is reverse-biased and the power-limited converter operates in the manner described above.

On the other hand, if the input voltage Vin is too low (indicating too much power is being drawn by the system), then the voltage at input voltage Vin is less than the reference voltage REF and the amplifier's output voltage is reduced, so that transistor Q2 conducts, which pulls the input port 101 of the PWM controller chip 100 to a lower voltage. This reduces the maximum current sense voltage which, in turn, reduces the maximum peak current through the primary winding 141 of transformer T1 and thus decreases the maximum power the converter can draw.

As will be appreciated from the foregoing description, the power-limited voltage converter-based power management scheme of the present invention provides an effective and low cost scheme for span-powering the ringing voltage generator of a remote access platform serving a plurality of subscriber circuits. By appropriate selection of the isolating voltage produced by the power-limited voltage converter, and the value of the reservoir capacitor to which the isolating voltage is coupled, the invention is able to supply sufficient energy to enable the ring generator to sustain a predetermined load for a minimum amount of time, without collapsing the line.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method comprising the steps of:
   (a) providing an electrical energy utilization device, which is operative to generate electrical signals for distribution to a plurality of circuits coupled thereto, wherein loading of said electrical energy utilization device depends upon the number of circuits in use and the load of each circuit to which an electrical signal is supplied;
   (b) converting a voltage, supplied by a wireline that conveys communication signals to and from and is remotely powered by a communication facility, to an isolating voltage that charges an energy storage device coupled to said electrical energy utilization device; and
   (c) using electrical energy stored in said energy storage device in step (b) to deliver peak power required for said electrical energy utilization device to generate said electrical signals for plural ones of said circuits without exceeding the maximum power available from said wireline, and wherein said electrical energy utilization device comprises a ring generator, said electrical signal comprises a ringing voltage signal, and said circuits include subscriber line circuits, and wherein step (c) includes decoupling, from said wireline, low frequency ripple noise associated with said operation of said ring generator, so as not to interfere with digital telecommunication signals being conveyed over said wireline during remote powering thereof.

2. A method comprising the steps of:
   (a) providing an electrical energy utilization device, which is operative to generate electrical signals for distribution to a plurality of circuits coupled thereto, wherein loading of said electrical energy utilization device depends upon the number of circuits in use and the load of each circuit to which an electrical signal is supplied;
   (b) converting a voltage, supplied by a wireline that conveys communication signals to and from and is remotely powered by a communication facility, to an isolating voltage that charges an energy storage device coupled to said electrical energy utilization device; and
   (c) using electrical energy stored in said energy storage device in step (b) to deliver peak power required for said electrical energy utilization device to generate said electrical signals for plural ones of said circuits without exceeding the maximum power available from said wireline, and wherein said electrical energy utilization device comprises a ring generator, said electrical signal comprises a ringing voltage signal, and said circuits include subscriber line circuits, and wherein
   step (b) comprises coupling a wireline voltage supplied by said wireline to a power-limited voltage converter that is operative to convert said wireline voltage to said isolating voltage used to charge an energy reservoir capacitor coupled to said electrical energy utilization device and, for an overdeployment condition where said power-limited voltage converter is spaced apart from a source of said wireline voltage by a distance greater than a specified rating, controllably reducing the amount of power said power-limited voltage converter can supply, so as to prevent said wireline voltage from collapsing under a specified load.

3. The method according to claim 2, wherein said isolating voltage is larger than said voltage supplied by said wireline.

4. An apparatus comprising:
   an electrical energy utilization device, which is operative to generate electrical signals for distribution to a plurality of circuits coupled thereto, wherein loading of said electrical energy utilization device depends upon the number of circuits in use and load of each circuit to which an electrical signal is supplied;
   an energy storage device coupled to said electrical energy utilization device; and
   a voltage converter, coupled to a wireline that conveys communication signals to and from and is remotely powered by a communication facility, and being operative to convert a voltage supplied by said wireline to an isolating voltage that charges said energy storage device, in a manner that delivers peak power required for electrical energy utilization device to generate said electrical signals for plural ones of said circuits without exceeding the maximum power available from said wireline, wherein said electrical energy utilization device comprises a ring generator, said electrical signal comprises a ringing voltage signal, and said circuits include subscriber line circuits, and wherein the bandwidth of said power-limited voltage converter is limited to less than the frequency of said ring voltage signal, so as to reduce the effect of low frequency ripple noise associated with said operation of said ring generator on said wireline, so as not to interfere with digital telecommunication signals being conveyed over said wireline during remote powering thereof.

5. An apparatus comprising:

an electrical energy utilization device, which is operative to generate electrical signals for distribution to a plurality of circuits coupled thereto, wherein loading of said electrical energy utilization device depends upon the number of circuits in use and load of each circuit to which an electrical signal is supplied;

an energy storage device coupled to said electrical energy utilization device; and a voltage converter, coupled to a wireline that conveys communication signals to and from and is remotely powered by a communication facility, and being operative to convert a voltage supplied by said wireline to an isolating voltage that charges said energy storage device, in a manner that delivers peak power required for electrical energy utilization device to generate said electrical signals for plural ones of said circuits without exceeding the maximum power available from said wireline, wherein said electrical energy utilization device comprises a ring generator, said electrical signal comprises a ringing voltage signal, and said circuits include subscriber line circuits, and further including an over-deployment monitor circuit, which is operative, for an overdeployment condition where said voltage converter is spaced apart from a source of said wireline voltage by a distance greater than a specified rating, to controllably reduce the amount of power said voltage converter can supply, so as to prevent said wireline voltage from collapsing under a specified load.

6. The apparatus according to claim 5, wherein said isolating voltage is larger than said voltage supplied by said wireline.

7. The apparatus according to claim 5, wherein said over deployment monitor circuit is operative, in response to said wireline voltage dropping to a low value associated with too much power being drawn from said wireline, to reduce the maximum power said voltage converter can extract from said wireline.

8. An apparatus comprising:

an electrical energy utilization device, which is operative to generate electrical signals for distribution to a plurality of circuits coupled thereto, wherein loading of said electrical energy utilization device depends upon the number of circuits in use and load of each circuit to which an electrical signal is supplied;

an energy storage device coupled to said electrical energy utilization device; and a voltage converter, coupled to a wireline that conveys communication signals to and from and is remotely powered by a communication facility, and being operative to convert a voltage supplied by said wireline to an isolating voltage that charges said energy storage device, in a manner that delivers peak power required for electrical energy utilization device to generate said electrical signals for plural ones of said circuits without exceeding the maximum power available from said wireline, wherein said electrical energy utilization device comprises a ring generator, said electrical signal comprises a ringing voltage signal, and said circuits include subscriber line circuits, and wherein said voltage converter is operative to supply a maximum amount of power to said electrical energy utilization device, such that at a maximum specified deployment length of said apparatus relative to a source of said wireline voltage, and with said electrical energy utilization device operating at maximum power, said voltage converter supplies as much power to said electrical energy utilization device as possible, without allowing said electrical energy utilization device loading to collapse said wireline voltage.

9. A wireline power extraction interface for powering an electrical energy utilization device that generates electrical signals for distribution to a plurality of circuits coupled thereto, wherein loading of said electrical energy utilization device is dependent upon the number of said circuits in use and the load of each circuit to which an electrical signal is supplied, said interface comprising;

an energy storage device coupled to said electrical energy utilization device; and a power-limited voltage converter, coupled to a wireline that conveys communication signals to and from and is remotely powered by a communication facility, and being operative to convert a voltage supplied by said wireline to an isolating voltage that charges said energy storage device in a manner that delivers peak power required for said electrical energy utilization device to generate said electrical signals for plural ones of said circuits without exceeding the maximum power available from said wireline, wherein the bandwidth of said power-limited voltage converter is limited to less than the frequency of said electrical signal, so as to reduce the effect of low frequency ripple noise associated with operation of said electrical energy utilization device on said wireline, so as not to interfere with digital telecommunication signals being conveyed over said wireline during remote powering thereof.

10. A wireline power extraction interface for powering an electrical energy utilization device that generates electrical signals for distribution to a plurality of circuits coupled thereto, wherein loading of said electrical energy utilization device is dependent upon the number of said circuits in use and the load of each circuit to which an electrical signal is supplied, said interface comprising;

an energy storage device coupled to said electrical energy utilization device; and a power-limited voltage converter, coupled to a wireline that conveys communication signals to and from and is remotely powered by a communication facility, and being operative to convert a voltage supplied by said wireline to an isolating voltage that charges said energy storage device in a manner that delivers peak power required for said electrical energy utilization device to generate said electrical signals for plural ones of said circuits without exceeding the maximum power available from said wireline, further including an over-deployment monitor circuit, which is operative, for an overdeployment condition where said interface is spaced apart from a source of said wireline voltage by a distance greater than a specified rating, to controllably reduce the amount of power said power-limited voltage converter can supply, so as to prevent said wireline voltage from collapsing under a specified load.

11. The interface according to claim 10, wherein said over deployment monitor circuit is operative, in response to said wireline voltage dropping to a low value associated with too much power is being drawn from said wireline, to reduce the maximum power said power-limited voltage converter can extract from said wireline.

12. A wireline power extraction interface for powering an electrical energy utilization device that generates electrical signals for distribution to a plurality of circuits coupled thereto, wherein loading of said electrical energy utilization device is dependent upon the number of said circuits in use and the load of each circuit to which an electrical signal is supplied, said interface comprising;

an energy storage device coupled to said electrical energy utilization device; and a power-limited voltage converter, coupled to a wireline that conveys communication signals to and from and is remotely powered by a communication facility, and being operative to convert a voltage supplied by said wireline to an isolating voltage that charges said energy storage device in a manner that delivers peak power required for said electrical energy utilization device to generate said electrical signals for plural ones of said circuits without exceeding the maximum power available from said wireline, wherein said power-limited voltage converter is operative to supply a maximum amount of power to said electrical energy utilization device, such that at a maximum specified deployment length of said interface relative to a source of said wireline voltage, and with said electrical energy utilization device operating at maximum power, said power-limited voltage converter supplies as much power to said electrical energy utilization device as possible, without allowing said electrical energy utilization device loading to collapse said wireline voltage.

* * * * *